3,063,883
REINFORCED RESIN LAMINATES
Richard S. Brissette, Emerson, N.J., assignor to Union Carbide Corporation, a corporation of New York
No Drawing. Filed Mar. 30, 1961, Ser. No. 99,342
16 Claims. (Cl. 154—43)

This invention relates to glass fiber-reinforced resin laminates and to an improved glass fiber preform mat for use in the production of such reinforced resin laminates. More particularly, the invention relates to a high-strength reinforced resin laminate prepared by the resin-impregnation of a preform mat composed of glass fibers bound by intermesh with synthetic fibers composed of an acrylonitrile-vinyl chloride copolymer.

It is known that plastic resinous compositions can be reinforced by lamination with glass fibers in order to increase the tensile strength and impact resistance of the compositions. Glass fibers in the form of free continuous strands, as textile fabrics, or as chopped or continuous strands which have initially been preformed into mats are most commonly used for this purpose. Moreover, glass fiber preform mats in both planar form and in non-planar configurations suitable for use in the production of shaped articles have found widest acceptance as the reinforcing material. Such preform mats are generally prepared, for instance, by introducing the glass fibers in the form of strands containing about 100 to 200 fibers each into a plenum chamber wherein they are deposited on the screens or ventilated molds. Such a procedure is ordinarily accompanied by exhaustion through the screen or mold so as to cause the glass fibers to deposit on and form around the surface of the screen or mold.

It is also known that glass fiber preform mats prepared in this manner lack sufficient strength and rigidity for further handling, particularly during subsequent impregnation or lamination operations, unless a binder for the glass fibers is employed. According to Sonneborn, "Fiber-Glass Reinforced Plastics," Reinhold Publishing Company, 1954, the binders finding conventional use in this connection are generally polymeric resins in the form of water emulsions, solvent solutions or powders. Several different kinds of synthetic resins have been used as the binder, with polyester, melamine, and phenolic resins being most commonly employed. Thus, for example, in preparing a glass fiber preform mat, a water emulsion or solvent solution of the binder can be atomized in the plenum chamber simultaneously with the introduction of the glass fibers or sprayed onto the resulting mat. Alternatively, when employed in power form, the binder can be dusted and mixed in the air stream of the plenum chamber together with the glass fibers. After deposition of the glass fibers and the binder, the resulting mat must be heated to a temperature sufficient to cause the binder to adhere to the glass fibers or to polymerize in the mat. On cooling, the preform mat prepared in this manner generally has sufficient strength to permit handling.

However, it is not only essential that the glass fiber preform mats have sufficient strength for handling so as to prevent disintegration, but it is also at least desirable that they be characterized by good drape and drawability so as to permit and facilitate their conformation to non-planar shapes with or without mold pressure. By way of illustration, good drape over non-planar surfaces without buckling or tearing is a desirable property for the preform mats especially in connection with hand lay-up work wherein the mat is cut to size and then draped over a suitably shaped form or mold. In addition, good drawability of the mat is also a desirable property. In match-metal molding, for instance, a mat with poor drawing characteristics will often break in deep, non-planar shapes, ultimately giving rise to weak, non-reinforced areas in the resin laminate produced therefrom.

Other features found desirable in preform mats of this nature are the uniform dispersion of the glass fibers and the binder throughout the mat, the cleanliness and whiteness of the mat binder, and the susceptibility of the mat to uniform wet-out by the impregnating resin subsequently used. This last factor is of great importance to laminating operations for any incomplete penetrations or wet-out of the resin into the mat may result in the production of a laminate evidencing poor appearance and low strength. Moreover, the wet-out of the mat should, for best results, be sufficiently complete so that the glass fibers and binder are nearly invisible in the resulting laminate.

For these reasons, the compounds which are suitable for use as binders in the production of glass fiber preform mats, especially those ultimately employed in the production of reinforced resin laminates, are generally limited to the several ones presently recognized by the art as hereinabove described. However, these binders and the methods of applying them are not entirely satisfactory. For instance, in conventional methods of application, part of the binder is carried through the preform mat and into the exhaust system of the plenum chamber. Thus, when using binders in powder form, as much as 50 percent of the binder can be lost in the exhaust system. This is particularly true when making fine glass fiber preform mats such as those weighing about 0.5 to 2 ounces per square foot. The loss of binder results in high production costs and necessitates frequent equipment cleanup. It is also difficult with the use of presently employed binders to control the amount of binder retained by the preform mat. Such control is nevertheless desirable in order to achieve the uniform dispersion of binder throughout the mat. In addition, many binders are not always satisfactory with all types of impregnating resins because of poor bonding which may result in the accumulation of the impregnated resin in the poorly bonded sections of the mat. In other instances, the binder may engender the production of preform mats which are characterized by poor drape and drawability as evidenced especially when forming the mat into non-planar shapes.

Compatibility and wet-out problems may also exist when using a conventional binder. For instance, glass fiber-reinforced epoxy resin laminates have not been entirely satisfactory because of the lack of a suitable preform mat of glass fibers which can be completely wet-out and be compatible with the impregnating resin. The use of a glass fiber preform mat containing a polyester resin binder, for example, in producing a reinforced epoxy resin laminate results in a spongy, stiff, incompletely impregnated product which is unsuitable for use in many applications. It is only with difficulty that reinforced epoxy resin laminates having a strength equivalent to reinforced polyester resin laminates can be made, although theoretically the reinforced epoxy resin laminate should be stronger. This lack of strength and inferior appearance, it is believed, is created by the incompatibility of the polyester resin binder with the impregnating epoxy resin. The impregnating resin apparently cannot completely wet-out and bond with the preform mat when such binder is employed, thus resulting in the inferior appearance and poor mechanical strength of the resulting laminate. Voids and air-bubbles caused by the incomplete resin impregnation of the mat also decreases the commercial value of the reinforced resin laminate.

It is, therefore, one of the objects of the present invention to make a glass fiber preform mat which will have good mechanical strength, good drape and good drawability, and in which the amount of binder can be accurately controlled without loss of part of the binder in the preforming operation.

It is another object of this invention to provide a glass fiber preform mat for use in the production of reinforced resin laminates which will completely wet-out with the impregnating resin, especially with an epoxy resin, so as to produce a strong, hard-surfaced, completely impregnated laminate which is substantially free of voids and bubbles and has good mechanical strength and appearance.

It has now been found that such objects, and others as will be evident hereinafter, can be achieved in a glass fiber preform mat by employing as a binder therein substantially unoriented synthetic fibers comprised of a copolymer containing about 40 percent of acrylonitrile and about 60 percent of vinyl chloride polymerized therein and having a fineness of less than 10 denier. The copolymeric fibers are incorporated in the preform mat in an amount of at least about 2 percent by weight, or slightly less, based upon the weight of glass fibers, and are randomly bonded to one another at their sites of intersection while necessarily being essentially free from bonding with the glass fibers.

The preform mats of this invention are made by intimately mixing the copolymeric fibers with conventional glass fibers during the formation of the mat and thereafter setting the copolymeric fibers by heating the mat under pressure at a temperature of between about 275° F. to about 350° F. and subsequently maintaining the pressure on the mat while cooling the mat to a temperature below about 225° F. Preform mats prepared in this manner have strengths which are sufficient for handling and in most cases are superior in strength to mats made with conventional binders. For example, the tensile strength of the preform mats of this invention is generally in the range of from about 13 to 15 pounds, while similar preform mats containing, however, a conventional polyester resin binder applied in either liquid or powder form ordinarily have a tensile strength of only about 9 to 10 pounds. In addition, the preform mats of this invention evidence superior drape and drawability, which characteristics, it is believed, are imparted by the natural elongation and flexibility of the copolymeric fibers and by the intermesh of the copolymeric and glass fibers, as well as by the freedom from adhesion or bonding between the copolymeric and glass fibers.

Moreover, the use of acrylonitrile-vinyl chloride copolymeric fibers in accordance with this invention affords a desirable result ordinarily not achieved by the use of conventional binders. Namely, by the use of the copolymeric fibers, the glass fibers are bound in an intermesh producing a strong but resilient preform mat which is resistant or stable to elevated temperatures such as those encountered during resin impregnation operations. In match-metal molding, for example, the preform mat is placed between heated molds and the impregnating resin is then poured over the surface of the mat. Many conventional thermoplastic binders, when incorporated in a preform mat, will soften before the mold is closed. As a result, the glass fibers in the mat tend to slip and flow, and are often so displaced in the resulting laminate that a high incidence of rejects is frequently incurred. This movement of the glass fibers during molding is generally termed "washing" and is highly undesirable. Advantageously, the "washing" of the glass fibers is not encountered to any significant extent when employing the preform mats of this invention in similar operations.

The results secured by the use of acrylonitrile-vinyl chloride copolymeric fibers as herein described are particularly unique since other thermoplastic fibers are either entirely unsuitable for use in the production of glass fiber preform mats, or lead to properties which are undesirable in the mats. For instance, acrylonitrile-vinyl chloride copolymeric fibers appear to have properties which render them ideally adaptable for use as a binder in glass fiber preform mats, that is to say, the fibers have a softening temperature in the range of from about 250° F. to about 350° F., and do not evidence shrinkage or significant discoloration at such temperatures. Fibers having a lower softening temperature, i.e., less than about 250° F. will subsequently fuse during molding in conjunction with resin impregnation and/or create a "washing" effect, both of which are undesirable features. Fibers having a softening temperature above about 350° F., on the other hand, are equally unsatisfactory as such temperatures are difficult to obtain with standard steam-heated curing ovens. Moreover, fibers evidencing a tendency to shrink and discolor at mat forming or resin impregnation temperatures will ordinarily cause an undesirable puckering or displacement of the glass fibers during the setting of the mat and/or during its impregnation, and may also contribute an unwanted color to the mat which prevents securing a nearly transparent laminate with colorless impregnating resins. Such disadvantages are not encountered in accordance with the present invention.

A particular advantage attending the use of unoriented acrylonitrile-vinyl chloride copolymeric fibers in accordance with this invention lies in their ability to be fractured and intimately dispersed throughout the glass fibers during the production of the preform mats.

In practice of this invention, the acrylonitrile-vinyl chloride copolymeric fibers can be incorporated in the glass fiber preform mat in any desired manner. For instance, the copolymeric fibers can, if desired, be chopped into short staple lengths and fed to a preforming (plenum) chamber. By intimately dispersing the copolymeric fibers into the air stream of the preforming chamber together with the glass fibers, the mat deposit is an indeterminately intermingled mass containing, generally, an even dispersion of the copolymeric fibers throughout the glass fibers. Continuous strands of the copolymeric fibers can also be employed but are less preferred for use.

The preform mats can be made either on a piece-wise basis or continuously. Non-planar preform mats, for example, are best made piece-wise by simultaneously depositing the copolymeric fibers and the glass fibers on a preform mold until the desired thickness is built up, and then heating the preform mold and mat under pressure to set the copolymeric fibers. Continuous methods are advantageously employed in making planar mats. In this method, by way of illustration, the glass fibers and the copolymeric fibers are fed at predetermined rates into a preforming chamber and deposited on a slowly moving perforated belt generally made of metal screen stock or chain mail. The belt conveys the continuous mat through an oven wherein the mat is heated. Pressure applied to the hot mat secures a compact, strong mat upon being discharged from the oven and cooled. The mat can then be taken up on a reel for storage and ultimate use.

An advantageous method of producing staple lengths of acrylonitrile-vinyl chloride copolymeric fibers for introduction into the air stream of the preforming chamber on either a piece-wise or continuous production basis is by means of a series of drafting rolls which break or fracture the fibers into such usable lengths, and a beater roll or disperser to then cause the fibers to separate in the air stream of the preforming chamber, such as is disclosed in U.S. Patent 2,948,021. The acrylonitrile-vinyl chloride copolymeric fibers characteristically have a low tensile strength in the unoriented form, are essentially uniform in diameter, and are easily fractured by the sudden change in tension created by the drafting rolls. A series of three rolls, each of the latter two having a peripheral speed greater than the previous roll, has been found to be preferred. The distance between the rolls and the speed of the rolls can determine the approximate staple length of the fibers. The beater roll can be of the picker type, or preferably, equipped with rubber brushes or pads to throw or project the fibers into the air stream of the preforming chamber. The amount of fibers to be deposited on the mat can be controlled by the feed speed of the fiber tow to the first drafting roll. This method is of distinct advantage since it permits an accurate metering of the amount of copolymeric fibers which are to be intermixed with the glass fibers.

If desired, the acrylonitrile-vinyl chloride copolymeric fibers can, instead, be swirled as one continuous filament or bundle of filaments onto the mat during the preforming operation. This method likewise permits control over the amount of fibers used by regulating the speed of feed of the roving or tow. Hand carding methods can also be employed, if desired. Thus, when mixing the copolymeric fibers with glass fibers as herein described, no substantial loss of fiber binder is incurred, a result heretofore impossible to accomplish with conventional liquid or powder binders.

It has been found that both the denier size and staple length of the copolymeric fibers are determinative at least in part of the strength of the preform mats of this invention. The denier size should be below 10 to give sufficient strength for normal handling, with denier sizes of 4 to 6 preferred for best results. These fine fibers apparently provide the necessary interlocks or intersections with glass fibers to bind the glass fibers into the mat. When staple lengths of the copolymeric fibers are employed, such as chopped strands of between 1 and 4 inches in length, it has been found that the glass fiber preform mats evidencing greatest strength are obtained when the length of the copolymeric fibers approaches or equals the length of the glass fibers employed. For most practical purposes, a staple length of about 2 inches is preferred, with the strength of the mat decreasing somewhat when either 1 inch or 4 inch staple lengths are employed.

It has been also found that the copolymeric fibers must be substantially unoriented, that is, stretched not more than about 200 percent after solvent removal during their production. While a stretching of about 100 percent does not materially alter the properties of the preform mat, oriented yarns which have been stretched 500 to 800 percent or more are unsuitable. Excessive shrinking of the oriented fibers occurs when the mat is heated to set the copolymeric fibers, and/or during subsequent resin impregnation causing the puckering and undesirable distortion of the preform mat.

In preparing the preform mats of this invention, amounts of at least about 4 percent or more of the copolymeric fiber based upon the weight of the glass fibers are preferred. If desired, lesser amounts, i.e., as little as about 2 percent by weight, or slightly less of the copolymeric fibers can be used. In amounts of about 4 percent by weight, the cost of the copolymeric fibers is about equivalent to that of the most efficient resin binder. For most uses, amounts of from about 4 percent to about 5 percent by weight of the copolymeric fibers are especially preferred, although amounts of up to about 50 percent by weight of the copolymeric fibers can be used. However, the use of such excess amounts may engender little increase in the strength of the preform mat and serves only to increase the cost of the mat.

After the preform mat is deposited, it is necessary that the copolymeric fibers of the mat be set by the application of heat and pressure in order to achieve desired strength. To this end, the mat should be heated to a temperature of from about 275° F. to about 350° F. Temperatures above about 350° F. are difficult to secure on standard forming equipment and tend to cause a yellowing of the copolymeric fibers. Moreover, the higher temperatures can result in the thermal decomposition of the copolymeric fibers, with an ultimate loss in strength of the mat, and thus are not desired. Temperatures below 275° F. have not been found suitable to set the copolymeric fibers, the use of such temperatures resulting, instead, in the production of a loose, springy, and weak mat. Heating time is not narrowly critical, although it should be sufficient to soften the copolymeric fibers, and is preferably in the order of from about 1 to 2 minutes.

Low positive pressures should be employed during the heating of the preform mat. Pressures of the order of about 1 to 5 p.s.i. applied to the mat during heating provide mats of good strength after cooling. For best results, the pressure should be evenly applied to all surfaces of the mat. If desired, this pressure can be created by a differential air pressure effected by pulling heated air through the mat. Cooling of the mat while under pressure is preferred in order to produce dense strong mats.

It is also preferred in the production of these preform mats of this invention that the glass fibers employed be chopped into convenient lengths, such as about 2 inches or more, although continuous lengths can also be employed. The glass fibers can be of any conventional size, such as between 5 microns and 15 microns in diameter. Glass fibers having diameters between 8 and 10 microns are most readily available commercially, and are therefore preferred. If desired, the glass fibers can be treated with a finishing compound to provide free linkages for adhesion of the resin with which it is subsequently impregnated and to improve the strength of the resulting laminate. Such finishes as chrome complexes, e.g. methacrylate chromic chloride, or silane finishes such as are obtained by treatment with vinyl trichlorosilane serve effectively in increasing the adhesion and the wetting action of the impregnating resin. Moreover, while such finishes can have some effect on the strength of the preform mat and the resin laminate subsequently obtained therefrom, the preform mats of this invention show increased strength over mats prepared with other binders even when both employ the same or comparable types of glass fibers.

Without desiring to be bound by any particular theory, it is believed that the preform mats of this invention are composed of an intermesh or entanglement of glass and copolymeric fibers, with the latter fibers being randomly bonded at their sites of intersection while being essentially free from adhesion or bonding with the glass fibers. This theory is borne out by microscopic examination of the mat and by the fact that individual glass fibers can be pulled out of the mat until only the copolymeric fibers remain in the form of an entangled, lacy mat.

The use of vinyl chloride-acrylonitrile copolymer fibers as a binder in the preform mat has achieved results which are not attainable with conventional non-fibrous binders. For instance, it is possible to break up and recover both the glass and copolymeric fibers from mats not having acceptable strengths and to reform them into mats of acceptable quality. Further, it is readily possible to make mats heavier than 4 ounces per square foot. Such mats could not be prepared conveniently using conventional procedures and resin binders since the required curing time is inordinately long, and it is ordinarily difficult to cure the binder in the center of the mat without charring the binder on the outside of the mat. Under-curing of such mats, on the other hand, causes blistering in the laminates produced therefrom and is attended by poor strength.

The preform mats of this invention are not only superior in strength to conventionally bonded preform mats, but are lighter and loftier. They can also be completely conformed to all types of molds. This feature not only improves the appearance of the final laminate, but also greatly improves the strength of the product.

In addition, the preform mats of this invention have the distinct advantage over conventional resin-bonded preform mats of being completely wet-out by the impregnating resin, thus providing a smooth, hard-surfaced, high-strength laminate. This is particularly true with epoxy resins which contain 1-2 oxirane oxygen ($\alpha$ epoxy groups), and from which laminates heretofore have not been satisfactorily prepared. Such facility serves to open up new applications for epoxy resin laminates of high strength. Especially desirable results are achieved in this connection by the use of epoxy resins such as the diglycidyl ethers of bisphenols, as for instance, the diglycidyl ethers of 2,2-bis(p-hydroxyphenyl)methane 2,2-bis-(p-hydroxyphenyl)propane, and the like. The epoxy resin can be employed in conjunction with aliphatic or aromatic hardeners such as polyamines, polyhydric alcohols, etc. Moreover, the preform mats of this invention can also be impregnated with other resins, such as polyester, melamine, phenolic resins and the like, with nearly equally desirable results.

The following examples are illustrative of the invention.

Example I

One hundred ten grams of chopped glass fibers of about 2 inches in length, having a diameter of about 10 microns and in the form of strands consisting of about 204 fibers each were hand mixed with 5 grams of 2-inch staple lengths of 6-denier, unoriented, 40 percent acrylonitrile 60 percent vinyl chloride copolymeric hand-carded fibers which had been stretched about 100 percent in the spinning bath, but which were still unoriented. The copolymeric fibers employed were further characterized by having a tenacity of about 1 gram per denier, an ultimate elongation of about 100 percent, and evidencing no substantial shrinking in boiling water. Mixing was continued until visual observation indicated that individual tufts were disentangled and an intimate fiber blend was achieved. Mixing time amounted to about 60 minutes. The mixture was slowly fed to the suction inlet of a preforming chamber having a rectangular rotating screen at the bottom of the chamber, over a period of about 20 minutes. The resulting mat had a weight of about 56 grams per square foot. The mat was removed from the preforming screen, placed between two sheets of cellophane, and inserted into a heated platen press. The mat was heated for 2 minutes at a temperature of 329° F. and under a positive pressure of about 2 p.s.i. between the plates of the press.

Several 3″ x 5″ samples were subsequently cut from the heat and pressure formed mat and tested for tensile strength. The test consisted of anchoring one end of the mat in a clamping device and suspending from the other, free end a lead-shot bucket. Lead shot was poured into the bucket until the mat parted. The results of tests on three samples of this mat indicated tensile strengths of 15.5 pounds, 9.6 pounds and 15.2 pounds, respectively, for an average strength of 13.4 pounds. A recheck of the results of this example indicated strengths of 18.5 pounds, 14.5 pounds, and 12.0 pounds, respectively, for an average strength of 15.0 pounds. In addition, the mat samples were found to have a soft feel and excellent draping qualities.

For comparison, a commercially available mat (Owens Corning Glass Co. Type 21 mat) employing an emulsion-type polyester resin binder was tested in the same manner as described above in this example. The polyester-bonded mat had a tensile strength, as determined from the results of tests on three samples, of 10.3 pounds, 9.5 pounds, and 7.5 pounds, respectively, for an average strength of 9.1 pounds. The mat was relatively stiff and did not have the drape of the copolymeric fiber-bound mat.

Example II

The procedure of Example I was followed in preparing a preform mat using 2-inch staple lengths of 4-denier, unoriented, 40 percent acrylonitrile-60 percent vinyl chloride copolymeric fibers as the binder. The copolymer fibers were further characterized by having a tenacity of about 1 gram per denier, an ultimate elongation of about 100 percent, and evidencing no substantial shrinkage in boiling water. Samples of the mat were tested in the same manner as in Example I. Such tests indicated tensile strengths of 14.7 pounds, 14.7 pounds, and 10 pounds, respectively, for an average strength of 13.1 pounds. In addition, the mat was found to have a good hand and excellent draping qualities.

Example III

The procedure of Example I was followed in preparing a preform mat using 1-inch staple lengths of 4-denier, unoriented, 40 percent acrylonitrile–60 percent vinyl chloride copolymeric fibers which had been stretched in the spinning bath about 100 percent but which were still unoriented. The copolymeric fibers were further characterized by having a tenacity of about 1 gram per denier, an ultimate elongation of about 100 percent, and evidencing no substantial shrinking in boiling water. Samples of the cooled preform mat were tested in the same manner as in Example I. Such tests indicated tensile strengths of 12.8 pounds, 10.6 pounds, and 13.0 pounds, respectively, for an average strength of 12.1 pounds. In addition, the mat was found to have a good hand and drape.

Example IV

The procedure of Example I was followed in preparing a preform mat using 2-inch staple lengths of 6-denier, unoriented, 40 percent acrylonitrile–60 percent vinyl chloride copolymeric fibers which were unstretched in the spinning bath. The copolymeric fibers were further characterized by having a tenacity of about 1 gram per denier, an ultimate elongation of about 100 percent, and evidencing no substantial shrinkage in boiling water. Samples of the cooled preform mat were tested in the same manner as in Example I. Such tests indicated tensile strengths of 11.3 pounds, 11.0 pounds, and 9.6 pounds, respectively, for an average strength of 10.5 pounds. The mat was soft to the feel and had excellent draping qualities.

Example V

For comparison studies of bench-cured impregnated laminates, two comparable types of glass mats were employed. One mat, designated as mat A was a 2 oz. per sq. ft. mat prepared in the manner described in Example I, using 6-denier copolymeric fibers of a 40 percent acrylonitrile-60 percent vinyl chloride copolymer chopped into 2-inch lengths. The glass fibers had a chrome complex finish and were about 10 microns in diameter and in strands of about 204 fibers. The copolymeric fibers were employed in an amount of about 5 percent by weight of the glass fibers. The other mat, designated as mat B, was a 2 oz. per sq. ft. commercially available mat (Owens Corning Fiber Glass Co. Type 219 mat) having an emulsion-applied polyester resin binder.

Both mats were impregnated in an identical manner with about 300 grams of an epoxy resin of the following composition: 400 parts of the diglycidyl ether of 2,2-bis(4-hydroxyphenyl)-propane, 400 parts of butyl glycidyl ether, and 180 parts of an amine type hardener (about 37 percent of acrylonitrile diethylenetriamine, about 37 percent of diethylenetriamine, and about 26 percent of amine 220), per each ounce of mat. The two mats were laid up, impregnated with the resin, and bench-cured overnight at room temperature.

The following table summarizes the results of physical property tests subsequently conducted on the samples at room temperature.

|  | Resin Impregnated Mat A | Resin Impregnated Mat B |
| --- | --- | --- |
| Flexural strength (p.s.i.) | 25,970 | 19,460 |
| Modulus (p.s.i.) | $1.06 \times 10^6$ | $1.2 \times 10^6$ |
| After 2 hr. water boil: | | |
| Flexural strength (p.s.i.) | 22,600 | 19,200 |
| Modulus (p.s.i.) | $0.853 \times 10^6$ | $0.546 \times 10^6$ |

Mat A was completely wet-out by the impregnating resin giving a smooth surface and a clear, transparent appearance. Mat B showed very poor wet-out and an extremely poor, spongy appearance.

*Example VI*

For comparison studies of match-metal molded impregnated laminates, glass fiber mats similar to those employed in Example V were used. Mat A represents the 2 oz. per sq. ft. preform mat of this invention. Mat B represents the 2 oz. per sq. ft. Type 219 mat as heretofore described.

Both mats were impregnated with 300 grams of an epoxy resin, the diglycidyl ether of 2,2-bis(4-hydroxyphenyl)methane, hardened with an amine hardener (about 60 percent of metaphenylenediamine and about 40 percent of methylene dianiline), per each six ounces of mat. The impregnated mats were match-metal molded into flat panels measuring ⅛-inch thick by one foot square and post-cured. Curing was done under a pressure of about 10 to 20 p.s.i. by heating the impregnated mats at a temperature of 300° F. for two hours and then at a temperature of 400° F. for six hours.

The following table summarizes the results of physical property tests subsequently conducted on the samples.

|  | Resin Impregnated Mat B | Resin Impregnated Mat B |
| --- | --- | --- |
| At Room Temperature: |  |  |
| Flexural strength (p.s.i.) | 58,600 | 40,300 |
| Modulus (p.s.i.) | $2.10 \times 10^6$ | $1.75 \times 10^6$ |
| At 200° F.: |  |  |
| Flexural strength (p.s.i.) | 37,900 | 35,000 |
| Modulus (p.s.i.) | $1.46 \times 10^6$ | $1.50 \times 10^6$ |
| After 2 hr. water boil: |  |  |
| Flexural strength (p.s.i.) | 44,700 | 33,300 |
| Modulus (p.s.i.) | $2.18 \times 10^6$ | $1.35 \times 10^6$ |
| Room Temperature: |  |  |
| Tensile strength (p.s.i.) | 34,100 | 24,200 |
| Modulus (p.s.i.) | $2.05 \times 10^6$ | $1.73 \times 10^6$ |

This invention is a continuation-in-part of copending application, Serial No. 637,630, filed February 1, 1957, now abandoned.

What is claimed is:

1. A preform mat suitable for use in the production of reinforced resin laminates comprising an intermesh of glass fibers with substantially unoriented synthetic fibers produced from a acrylonitrile-vinyl chloride copolymer containing about 40 percent acrylonitrile and about 60 percent vinyl chloride polymerized therein and having a fineness of less than about 10 denier, wherein said synthetic fibers are randomly bonded to one another at their sites of intersection while being essentially free from bonding with said glass fibers and wherein said synthetic fibers are present in a weight proportion of from about 2 to about 50 percent based upon the weight of said glass fibers.

2. A preform mat suitable for use in the production of reinforced resin laminates comprising an intermesh of staple length glass fibers with substantially unoriented staple length synthetic fibers produced from an acrylonitrile-vinyl chloride copolymer containing about 40 percent acrylonitrile and about 60 percent vinyl chloride polymerized therein and having a fineness of less than about 10 denier, wherein said synthetic fibers are randomly bonded to one another at their sites of intersection while being essentially free from bonding with said glass fibers and wherein said synthetic fibers are present in a weight proportion of from about 2 to about 50 percent based upon the weight of said glass fibers.

3. The preform mat according to claim 2 wherein the synthetic fibers have a staple length of from about 1 to about 4 inches.

4. The preform mat according to claim 2 wherein the synthetic fiber fineness is from about 4 to about 6 denier.

5. The preform mat according to claim 2 wherein the synthetic fibers are present in a weight proportion of from about 4 to about 5 percent based upon the weight of the glass fibers.

6. In the method for making a glass fiber preform mat suitable for use in the production of reinforced resin laminates, the steps which include forming a mat comprising an intermesh of glass fibers with from about 2 to about 50 percent by weight based upon the weight of said glass fibers of substantially unoriented synthetic fibers produced from an acrylonitrile-vinyl chloride copolymer containing about 40 percent acrylonitrile and about 60 percent vinyl chloride polymerized therein and having a fineness of less than 10 denier; heating the intermeshed fibers to a temperature of from about 275° F. to about 350° F., while applying a positive pressure to the heated fibers, thereby imparting random bonding between said synthetic fibers at their sites of intersection while maintaining said synthetic fibers essentially free from bonding with said glass fibers; and subsequently cooling the resulting mat to a temperature below about 225° F.

7. In the method for making a glass fiber preform mat suitable for use in the production of reinforced resin laminates, the steps which include forming a mat comprising an intermesh of staple length glass fibers with from about 2 to about 50 percent by weight based upon the weight of said glass fibers of substantially unoriented staple length synthetic fibers produced from an acrylonitrile-vinyl chloride copolymer containing about 40 percent of acrylonitrile and 60 percent vinyl chloride polymerized therein and having a fineness of less than 10 denier; heating the intermeshed fibers to a temperature of from about 275° F. to about 350° F. while applying a positive pressure to the heated fibers, thereby imparting random bonding between said synthetic fibers at their sites of intersection while maintaining said synthetic fibers essentially free from bonding with said glass fibers; and subsequently cooling the resulting mat to a temperature below about 225° F.

8. The method according to claim 7 wherein the synthetic fibers have a staple length of from 1 to about 4 inches.

9. The method according to claim 7 wherein the synthetic fibers have a fineness of from about 4 to about 6 denier.

10. The method according to claim 7 wherein the synthetic fibers are employed in a weight proportion of from about 4 to about 5 percent based upon the weight of the glass fiber.

11. The reinforced resin laminate comprising an alpha-epoxy resin impregnated preform mat containing an intermesh of glass fibers with substantially unoriented synthetic fibers produced from an acrylonitrile-vinyl chloride polymer containing about 40 percent of acrylonitrile and about 60 percent of vinyl chloride polymerized therein and having a fineness of less than about 10 denier, wherein said synthetic fibers are randomly bonded to one another at their sites of intersection while being essentially free from bonding with said glass fibers and wherein said synthetic fibers are present in a weight proportion of from about 2 to about 50 percent based upon the weight of said glass fibers.

12. The reinforced resin laminate comprising an alpha-epoxy resin impregnated preform mat containing an intermesh of staple length glass fibers with substantially unoriented staple length synthetic fibers produced from an acrylonitrile-vinyl chloride copolymer containing about 40 percent acrylonitrile and about 60 percent vinyl chloride polymerized therein and having a fineness of less than about 10 denier, wherein said synthetic fibers are randomly bonded to one another at their sites of intersection while being essentially free from bonding with said glass fibers and wherein said synthetic fibers are present in a weight proportion of from about 2 to about 50 percent based upon the weight of said glass fibers.

13. The reinforced resin laminate according to claim 12 wherein the synthetic fibers have a staple length from about 1 to about 4 inches.

14. The reinforced resin laminate according to claim 12 wherein the synthetic fibers have a fineness of from about 4 to about 6 denier.

15. The reinforced resin laminate according to claim 12 wherein the synthetic fibers are present in a weight proportion of from about 4 to about 5 percent based upon the weight of the glass fibers.

16. The reinforced resin laminate according to claim 12 wherein the alpha-epoxy resin is produced from a bisphenol diglycidyl ether.

References Cited in the file of this patent

UNITED STATES PATENTS

| | | |
|---|---|---|
| 2,252,999 | Wallach | Aug. 19, 1941 |
| 2,357,392 | Francis | Sept. 5, 1944 |
| 2,483,405 | Francis | Oct. 4, 1949 |
| 2,689,199 | Pesce | Sept. 14, 1954 |
| 2,810,426 | Till et al. | Oct. 22, 1957 |

OTHER REFERENCES

Modern Plastics, November 1950, pages 113, 114, 116, 118, 120 and 122.

"What's New in Reinforcements," Modern Plastics, vol. 33, No. 6, February 1956; received in U.S. Patent Office Scientific Library, Jan. 30, 1956; pages 81–86, 210, 212, 214, 216, 218, 220, 222, 224.

UNITED STATES PATENT OFFICE
CERTIFICATE OF CORRECTION

Patent No. 3,063,883                          November 13, 1962

Richard S. Brissette

It is hereby certified that error appears in the above numbered patent requiring correction and that the said Letters Patent should read as corrected below.

Column 1, line 51, for "power" read -- powder --; column 7, line 59, for "21" read -- 219 --; column 9, in the table, heading to the second column, line 3 thereof, for "Mat B" read -- Mat A --.

Signed and sealed this 24th day of December 1963.

(SEAL)
ttest:

ERNEST W. SWIDER
testing Officer

EDWIN L. REYNOLDS

Acting Commissioner of Patents